United States Patent
Choi et al.

(10) Patent No.: US 11,647,470 B2
(45) Date of Patent: May 9, 2023

(54) METHOD AND APPARATUS FOR LYAPUNOV-BASED DATA TRANSMISSION USING PATH DIVERSITY IN UNMANNED AERIAL VEHICLE SYSTEM

(71) Applicant: Industry-Academic Cooperation Foundation, Chosun University, Gwangju (KR)

(72) Inventors: Wooyeol Choi, Gwangju (KR); Yonggang Kim, Suwon-si (KR)

(*) Notice: Subject to any disclaimer, the term of this patent is extended or adjusted under 35 U.S.C. 154(b) by 0 days.

(21) Appl. No.: 17/535,732

(22) Filed: Nov. 26, 2021

(65) Prior Publication Data
US 2022/0394636 A1 Dec. 8, 2022

(30) Foreign Application Priority Data
May 31, 2021 (KR) .......... 10-2021-0070212

(51) Int. Cl.
*H04W 52/46* (2009.01)
*H04W 52/06* (2009.01)

(52) U.S. Cl.
CPC .......... *H04W 52/46* (2013.01); *H04W 52/06* (2013.01)

(58) Field of Classification Search
CPC .......... H04W 52/06; H04W 52/46
See application file for complete search history.

(56) References Cited

U.S. PATENT DOCUMENTS 7,656,829 B2 * 2/2010 Kim .......... H04W 40/08
713/323

OTHER PUBLICATIONS

Y. Kim and W. Choi, "Lyapunov-Based Energy-Efficient Path Diversity for Data Transmissions in UAV Networks," in IEEE Wireless Communications Letters, vol. 10, No. 8, pp. 1766-1770, Aug. 2021, doi: 10 1109/LWC.2021.3079254.

* cited by examiner

*Primary Examiner* — James P Duffy

(57) ABSTRACT

Disclosed are data transmission method and apparatus using path diversity. The data transmission method using path diversity may include steps of: (a) calculating a delay robustness value representing path diversity for a routing path including at least one relay node; (b) determining a trade-off relationship between the delay robustness value and power consumption; (c) determining the power consumption and a routing path based on the trade-off relationship; and (d) transmitting data to a destination node through the routing path according to the power consumption.

8 Claims, 7 Drawing Sheets

METHOD AND APPARATUS FOR LYAPUNOV-BASED DATA TRANSMISSION USING PATH DIVERSITY IN UNMANNED AERIAL VEHICLE SYSTEM

CROSS-REFERENCE TO RELATED APPLICATION

This application claims the priority of Korean Patent Application No. 10-2021-0070212 filed on May 31, 2021, which is incorporated herein by reference in its entirety.

BACKGROUND OF THE INVENTION

Field of the Invention

The present disclosure relates to an unmanned aerial vehicle system and more particularly, to a method and an apparatus for Lyapunov-based data transmission using path diversity in an unmanned aerial vehicle system.

Description of the Related Art

Data transmission in an unmanned aerial vehicle (UAV) network may be performed through direct link between a source UAV and a destination UAV or multiple link set by relay UAV.

When using UAV support relay transmission, communication performance in a wireless network may be improved even in a network with serious interference.

Relay transmission through multiple UAV may increase network coverage, but data transmission may be unstable due to the movement of UAV and channel degradation.

As a result, since data including control information is not successfully received in a destination UAV node in a predetermined time threshold, a serious problem in an unmanned aerial vehicle system 100 sensitive to delay may occur.

The above-described technical configuration is the background art for helping in the understanding of the present invention, and does not mean a conventional technology widely known in the art to which the present invention pertains.

SUMMARY OF THE INVENTION

The present disclosure is derived to solve the problems described above, and an object of the present disclosure is to provide a method and an apparatus for Lyapunov-based data transmission using path diversity in an unmanned aerial vehicle system.

Another object of the present disclosure is to provide a method and an apparatus for deriving a trade-off relationship between path diversity and power consumption based on a Lyapunov drift-plus-penalty approach after calculating delay robustness according to path diversity.

Yet another object of the present disclosure is to provide a method and an apparatus for performing delay tolerant data transmission with allowable power consumption in an unmanned aerial vehicle system 100 by minimizing a Lyapunov drift-plus-penalty term.

Objects of the present disclosure are not limited to the objects described above, and other objects, which are not mentioned above, will be apparent from the following description.

According to an embodiment of the present disclosure, a data transmission method using path diversity may include steps of: (a) calculating a delay robustness value representing path diversity for a routing path including at least one relay node; (b) determining a trade-off relationship between the delay robustness value and power consumption; (c) determining the power consumption and a routing path based on the trade-off relationship; and (d) transmitting data to a destination node through the routing path according to the power consumption.

In the embodiment, the step (b) may include determining a trade-off relationship between the delay robustness value and power consumption according to a Lyapunov function.

In the embodiment, the step (c) may include determining the power consumption and the routing path by minimizing the upper bound of a Lyapunov drift-plus-penalty of the Lyapunov function.

In the embodiment, step (b) may include steps of: determining a delay outage probability for the routing path based on the delay robustness value; determining a transmission success probability function based on the delay outage probability; determining queue state change information based on the transmission success probability function; and determining a trade-off relationship based on the queue state change information.

According to another embodiment of the present disclosure, a data transmission apparatus may include a control unit configured to calculate a delay robustness value representing path diversity for a routing path including at least one relay node, determine a trade-off relationship between the delay robustness value and power consumption, and determine the power consumption and a routing path based on the trade-off relationship; and a communication unit configured to transmit data to a destination node through the routing path according to the power consumption.

In the embodiment, the control unit may determine a trade-off relationship between the delay robustness value and power consumption according to a Lyapunov function.

In the embodiment, the control unit may determine the power consumption and the routing path by minimizing the upper bound of a Lyapunov drift-plus-penalty of the Lyapunov function.

In the embodiment, the control unit may determine a delay outage probability for the routing path based on the delay robustness value, determine a transmission success probability function based on the delay outage probability, determine queue state change information based on the transmission success probability function, and determine the trade-off relationship based on the queue state change information.

Specific matters for achieving the above objects will be apparent with reference to embodiments to be described below in detail together with the accompanying drawings.

However, the present disclosure is not limited to embodiments to be disclosed below, but may be configured in various different forms, and will be provided to make the disclosure of the present disclosure complete and fully notify the scope of the present disclosure to persons with ordinary skill in the art to which the inventions pertain (hereinafter, "those skilled in the art").

According to the embodiment of the present disclosure, it is possible to enhance data transmission robustness while maintaining allowable transmission power of a relay node in an unmanned aerial vehicle system 100.

Further, it is possible to design an energy-efficient transmission method by modeling a balance relationship between path diversity and power consumption of the unmanned aerial vehicle system 100 using a Lyapunov drift-plus-penalty approach.

The effects of the present disclosure are not limited to the above-described effects, and it will be understood that provisional effects to be expected by technical features of the present disclosure will be apparent from the following description.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The present disclosure may have various modifications and various embodiments and specific embodiments will be illustrated in the drawings and described in detail.

Various features of the invention disclosed in the appended claims will be better understood in consideration of the drawings and the detailed description. Apparatuses, methods, manufacturing methods and various embodiments disclosed in the specification will be provided for illustrative purposes. The disclosed structural and functional features are intended to allow those skilled in the art to be specifically implemented in various embodiments, but are not intended to limit the scope of the invention. The disclosed terms and sentences are intended to be easily explained to the various features of the disclosed invention, but are not intended to limit the scope of the invention.

In describing the present disclosure, the detailed description of related known technologies will be omitted if it is determined that they unnecessarily make the gist of the present disclosure unclear.

Hereinafter, a method and an apparatus for Lyapunov-based data transmission using path diversity in an unmanned aerial vehicle system according to an embodiment of the present disclosure will be described.

Figure 1:
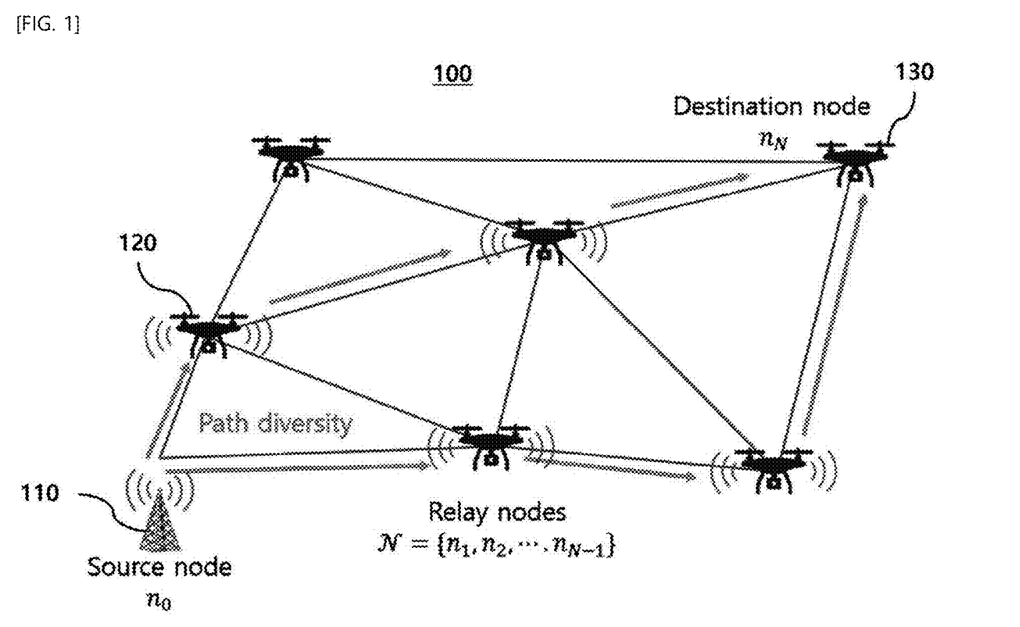
FIG. 1 is a diagram illustrating an unmanned aerial vehicle system according to an embodiment of the present disclosure.

FIG. 1 is a diagram illustrating an unmanned aerial vehicle (UAV) system 100 according to an embodiment of the present disclosure.

Referring to FIG. 1, the UAV system 100 may include a source node 110, at least one relay node 120, and a destination node 130. In an embodiment, the UAV system 100 may mean the UAV system 100.

In the UAV system 100 in which a channel condition is unstable as compared with a stationary network, delay-tolerant data transmission to the destination node 130 from the source node 110 may be important.

In a predetermined time threshold, the same data is transmitted through multi-routing paths to successfully receive data from a target to increase path diversity.

However, when the path diversity increases, the power consumption of the relay node 120 may also be increased.

In an embodiment, the relay node 120 may be referred to as a "routing node" or a term having an equivalent technical meaning thereto.

Accordingly, according to the present invention, a Lyapunov based energy-efficient path diversity method for data transmission in the UAV system 100 may be performed.

According to the present invention, delay robustness according to the path diversity is calculated and then a trade-off relationship between path diversity and power consumption may be derived based on a Lyapunov drift-plus-penalty approach.

A multi-path transmission method according to the present invention minimizes a derived drift-plus-penalty term, so that the delay-tolerant data transmission may be performed with allowable power consumption in the UAV system 100.

Robust data transmission may be performed in the UAV system 100 in which a source node no transmits a data packet or control packet to a destination node $n_N$. Wireless connection between the source node no and the destination node $n_N$ may be configured in both direct link and multiple link using relay nodes $N=\{n_1, n_2, \ldots, n_{N-1}\}$.

For example, one node of N may perform data transfer to the next node of the routing path, and transmission power from a node $n_i$ to a node $n_j$ at a time t may be represented as $p_{n_i,n_j}(t)$.

In the UAV system 100, a multi-routing path between the source node no and the destination node $n_N$ may be configured by nodes of $N=\{n_1, n_2, \ldots, n_{N-1}\}$.

In a feasible routing path, the source node no may transmit the same data through multi-routing paths to increase the robustness of data transmission. In this case, the feasible routing path may be represented as $R=\{R_1, R_2, \ldots, R_R\}$.

A feasible routing path may be dynamically changed according to the topology of the UAV system 100 and the source node 110 may periodically report changes in the network topology.

In the feasible routing path, the source node 110 may select a lower set of the routing path to increase the path diversity, and the path selection is represented by $\alpha^{R_l}$ and may be expressed as Equation 1.

$$\alpha^{R_l} = \begin{cases} 1, & \text{if } R_l \text{ is selected} \\ 0, & \text{otherwise.} \end{cases} \qquad [\text{Equation 1}]$$

For example, in the case of a routing path $R_1$, $x_{n_i,n_j}^{R_l}$ represents whether a link from $n_i \in N$ to $n_j \in N$ is included in $R_1 \in R$ and $x_{n_i,n_j}^{R_l}$ may be expressed as Equation 2.

$$x_{n_i,n_j}^{R_l} = \begin{cases} 1, & \text{if path from } n_i \text{ to } n_j \text{ in } R_l \\ 0, & \text{otherwise.} \end{cases} \qquad [\text{Equation 2}]$$

Through the selected routing path, the source node 110 transmits the same data to multi-routing paths to increase the path diversity to secure the data transmission to be successfully received from the destination node 130 in the predetermined time threshold.

At the time t, a data queue of the source node 110 is represented by Q(t) and a queue change may be expressed as Equation 3.

$$Q(t+1) = \max\{Q(t) + \theta(t), 0\} \quad \text{[Equation 3]}$$

Here, $\theta(t)$ represents the sum of arrival data and processing data at the time t. When the queue state follows $$\frac{1}{t}\sum_{\tau=0}^{t-1} \mathbb{E}[\theta(\tau)] \leq \frac{\mathbb{E}[Q(t)]}{t},$$

the queue Q(t) may be stable at an average rate.

In an embodiment, in terms of a Lyapunov based energy-efficient path diversity, a path diversity method for data transmission in the UAV system 100 may be used.

The increase in the path diversity may lead to data transmission robustness and the transmitted data may be successfully received and decoded in a receiver.

However, since the source node 110 uses the multi-routing path, the power consumption of the relay node 120 may be increased.

Since the power consumption is one of important elements to maintain the UAV system 100, there is a need for a method of increasing the data transmission robustness while maintaining the allowable transmission power of the relay node 120 in the network.

The transmission power consumption may be controlled to maintain the UAV system 100 according to a use scenario of the UAV system 100 and the energy capacity of the UAV.

In addition, it is possible to design a transmission method that requires less power to achieve throughput performance for energy-efficient data transmission.

In order to design an energy-efficient transmission method, a balance relationship between the path diversity and the power consumption of the UAV system 100 may be modeled using a Lyapunov drift-plus-penalty approach.

In an embodiment, in terms of delay-robust path diversity, the data transmission to the destination node 130 from the source node 110 is performed through the multi-routing path and each data transmission path may have different data transmission delay.

In order to determine the path diversity of the data transmission, when network information including delay is periodically reported to the source node 110 and the data transmission of at least one routing path is completed in a predetermined time threshold, the destination node 130 may successfully receive the data.

For example, $d_{n_0,n_N}^{R_l}(t) = \sum_{n_i,n_j \in \{N \cup n_0 \cup n_N\}} x_{n_i,n_j}^{R_l} d_{n_i,n_j}(t)$ represents a total delay from the nodes $n_0$ to $n_N$ through the routing path $R_l$. A minimum delay in the routing path selected in R may be shorter than a delay threshold $d_{th}$.

In $d_{min}(t) = \min\{d_{n_0,n_N}^{R_l}(t)\}$ for the selected path $R_l \in R$, $d_{min}(t)$ may represent the minimum delay. A non-selected path may be represented by $\mathcal{R}' = \{\{R_l\} | \alpha^{R_l} = 0, R_l \in \mathcal{R}\}$.

A delay constraint of the data transmission in the UAV system 100 may be expressed as the following Equation 4.

$$\gamma = Pr[d_{min}(t) > d_{th}] \quad \text{[Equation 4]}$$

$$= \prod_{R_l \in \mathcal{R} \setminus \mathcal{R}'} \alpha^{R_l} Pr\left[d_{n_0,n_N}^{R_l}(t) > d_{th}\right]$$

$$= \prod_{R_l \in \mathcal{R} \setminus \mathcal{R}'} \alpha^{R_l}\left(1 - Pr\left[d_{n_0,n_N}^{R_l}(t) \leq d_{th}\right]\right)$$

$$< \epsilon,$$

Here, $\gamma$ represents an outage probability and a threshold of the delay outage probability. In an embodiment, the delay outage probability may be less than a delay threshold $\epsilon$.

In an embodiment, when $\lambda^{R_l}$ an is $\ln(1-Pr[d_{n_0,n_N}^{R_l}(t) \leq d_{th}])$ and ln is $\omega'$, the delay constraint condition may be represented by Equation (5) after a log is taken on both sides of Equation 4.

$$\sum_{R_l \in \mathcal{R}} \alpha^{R_l} \lambda^{R_l} \leq \omega \quad \text{[Equation 5]}$$

Here, $\Sigma_{R_l \in} \mathcal{R} \, \alpha^{R_l} \lambda^{R_l} = \Sigma_{R_l \in} \mathcal{R} \setminus \mathcal{R}' \, \alpha^{R_l} \lambda^{R_l}$ may be $\alpha^{R_l} = 0$ with respect to $R_1 \in R0$.

The delay of the routing path may have a symmetric distribution in the range of $\lambda^{R_l} \in [\bar{\lambda}^{R_l} - \hat{\lambda}^{R_l}, \bar{\lambda}^{R_l} + \hat{\lambda}^{R_l}]$. Here, $\bar{\lambda}^{R_l}$ and $\hat{\lambda}^{R_l}$ may represent averages and delay uncertainty intervals. Then, in an embodiment, the upper bound of the outage probability may be derived as Equation 6.

$$Pr\left[\sum_{R_l \in \mathcal{R}} \alpha^{R_l} \lambda^{R_l} > \omega\right] \leq 1 - \Phi\left(\frac{\Gamma - 1}{\sqrt{R}}\right) \quad \text{[Equation 6]}$$

Here, $$\Phi(k) = \frac{1}{\sqrt{2\pi}} \int_{-\infty}^{k} \exp-\frac{\rho}{2} d\rho$$

and $\Gamma$ ($1 \leq \Gamma \leq R$) represent adjustable robustness values. The delay assumption of the symmetric distribution may limit feasible scenarios in the wireless network.

However, according to an empirical study on the delay distribution measured in the wireless network, the delay may be suitable for gamma or logistic distribution, and the upper bound indicated in Equation 6 may alleviate the delay constraint so that the upper bound is effectively maintained in asymmetric distribution.

The upper bound of the delay outage probability may vary depending on a robustness value $\Gamma$ representing the path diversity. If $\Gamma$ increases, many routing paths are used for data transmission and the path diversity may be increased.

According to an adjustable robustness value, a transmission success probability of data to the destination node $n_N$ from the source node $N_0$ may be defined as Equation 7.

$$f(\Gamma) = 1 - \left(1 - \Phi\left(\frac{\Gamma - 1}{\sqrt{R}}\right)\right)$$
$$= \Phi\left(\frac{\Gamma - 1}{\sqrt{R}}\right).$$
[Equation 7]

In an embodiment, a transmission success probability function of Equation 7 may be used to determine the routing path in the UAV system 100.

Figure 2:
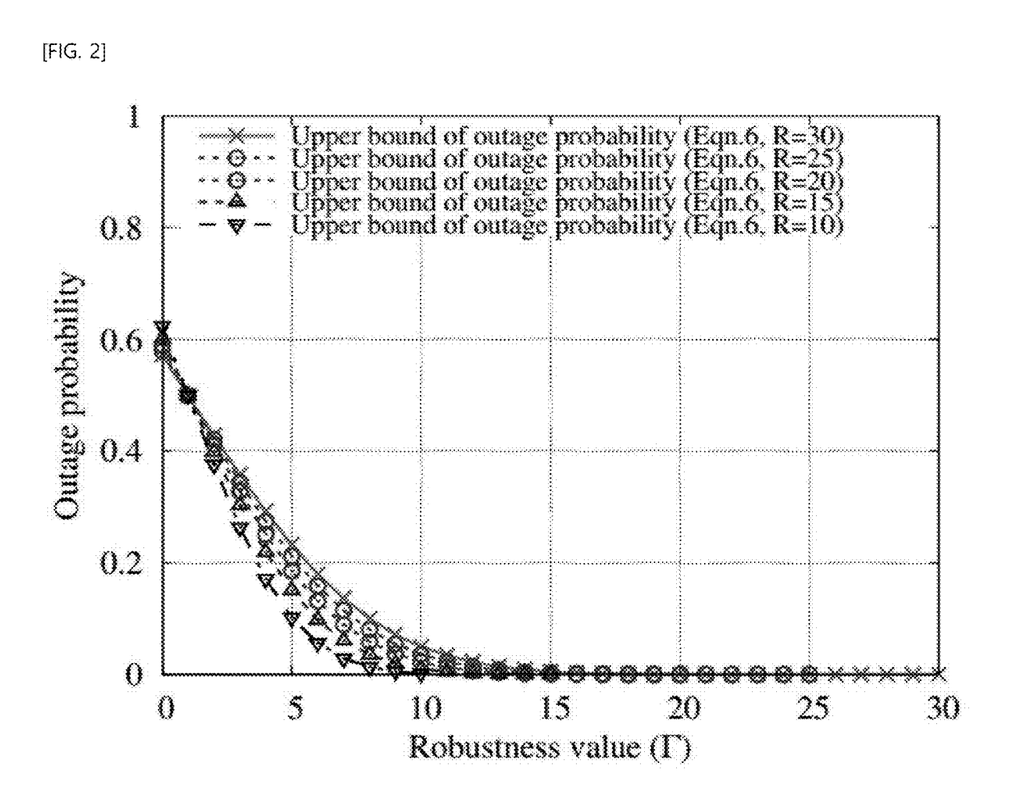
FIG. 2 is a diagram illustrating a upper bound graph of an outage probability according to an embodiment of the present disclosure.

FIG. 2 is a diagram illustrating an upper bound graph of an outage probability according to an embodiment of the present disclosure.

Referring to FIG. 2, it is possible to confirm the upper bound of the outage probability of Equation 6 in connection with the adjustable robustness value $\Gamma$. The result may indicate that the outage probability decreases as the robustness value increases. If $\Gamma$ increases by selecting more transmission paths, the outage probability may be reduced.

However, when the data transmission path increases, the sum of the transmission power may also be increased in the UAV system 100.

Therefore, when selecting a path for energy-efficient data transmission, both the outage probability and the power consumption may be considered.

In an embodiment, in terms of the selection of the Lyapunov based routing path, in a data transmission scenario, according to the present invention, the UAV center or source node 110 may transmit data to the destination node 130 through the multi-routing path. In an embodiment, the queue state may be expressed as Equation 3.

Since $\theta(t)$ is the sum of a data arrival amount $a(t)$ and a processing capability $b(t)$, expected queue state change information may be expressed as Equation 8 again using the transmission success probability function of Equation 7.

$$\mathbb{E}[\theta(t)] = \mathbb{E}[a(t) - f(\Gamma)b(t)]$$
[Equation 8]

According to the present invention, by utilizing the expected queue state change information in multi-path transmission decision, it is possible to increase the robustness of the data transmission while maintaining allowable power consumption in the UAV system 100.

When a routing path $\mathbb{R}_l \in \mathcal{R}$ for data transmission is selected, the relay node 120 may transmit the received data to the next node with power $p_{n_i,n_j}(t)$.

Thereafter, the transmission power consumption of all the relay nodes 120 required for the multi-path data transmission may be calculated as Equation 9.

$$p(t) = \sum_{R_l \in \mathcal{R}} \sum_{n_i,n_j \in \mathcal{N}} \alpha^{R_l} x^{R_l}_{n_i,n_j} p_{n_i,n_j}(t)$$
[Equation 9]

Wherein, $\Sigma_{R_l \in} \mathcal{R} \, \alpha^{R_l} = 1 + \Gamma$. An additional routing path for data transmission may be selected after the robustness value $\Gamma$.

An increase in path diversity for powerful data transmission and power consumption has a trade-off relationship.

In order to increase the data transmission robustness while maintaining allowable power consumption, the method according to the present invention may be modeled based on the Lyapunov drift-plus-penalty approach. A Lyapunov function $L(t)$ may be defined as Equation 10.

$$L(t) = \tfrac{1}{2} Q(t)^2$$
[Equation 10]

In the approach according to the present invention, the data queue may be stabilized by minimizing the queue change over time. $\Delta L(t)$ may represent a difference in Lyapunov function between two consecutive time slots.

Then, in an embodiment, a Lyapunov drift $\Delta L(t)$ may be expressed as Equation 11.

$$L(t) = \tfrac{1}{2} Q(t)^2$$
[Equation 11]

Here, B may represent the upper bound of $\tfrac{1}{2}\theta(t)^2$.

In an embodiment, referring to Equation 12, in order to consider the power consumption during multi-path data transmission in the UAV system 100, Equation 9 and a non-negative weight V may be added to Equation 11.

$$\Delta L(t) + V p(t) \leq B + V p(t) + Q(t)\theta(t)$$
[Equation 12]

The method according to the present invention minimizes the upper bound of a Lyapunov drift-plus-penalty term of Equation 12 to select a routing path among feasible paths while consuming a small amount of transmission power.

The data transmission success probability to the destination node 130 from the source node 110 is given as Equation 7 and the success probability may be adjusted by a robustness value $\Gamma$.

However, the transmission power of the UAV in the network may be increased by increasing robustness.

In an embodiment, in Table 1, it is possible to select a multi-routing path to ensure successful data transmission while maintaining the allowable transmission power amount.

TABLE 1

1: Initialize V .
2: while Q(t) ≠ 0 do
3:   Update Q (t) .
4:   for l = 1, 2, . . . , R do
5:     Calculate the required transmit power.
      $\Sigma_{n_i,n_j \in N} \, x^R_{n_i,n_j} p_{n_i,n_j}(t)$
6:   end for
7:     Select the routing path with the minimum transmit power.
8:   for $\Gamma$ = 0, 1, 2, . . . , R − 1 do
9:     Select additional $\Gamma$ paths with minimum power.
10:    Calculate $= \hat{\theta}(t) = a(t) - f(\Gamma)b(t)$,
11:    Calculate $\hat{B} + Vp(t) + Q(t)\hat{\theta}(t)$ .
12:   end for
13:    For the feasible routing path selections,
select the routing paths with the minimum value of
$\hat{B} + Vp(t) + Q(t)\hat{\theta}(t)$ for data transmissions at time t.
14:   t = t + 1.
15: end while In an embodiment, the non-negative weight V related with the trade-off relationship between the robustness and the power consumption may be initialized. When there is data to be transmitted to the source node 110, the total transmission power of each routing path may be calculated as shown in Line 5 of Table 1.

Then, the routing path with the minimum transmission power may be selected. Thereafter, an algorithm according to the present invention may select an additional routing path to increase the robustness so as to successfully receive data from the destination node in a specific time threshold.

The additional routing path may be selected by in Line 10 of Table 1. The delay outage probability may be the upper bound as shown in FIG. 2.

Then, $\hat{\theta}(t)=a(t)-f(\Gamma)b(t)$ and $\hat{B}+Vp(t)+Q(t)\hat{\theta}(t)$ may be calculated as in Line 11 and Line 12, respectively. $\hat{B}$ may be the upper bound of $\frac{1}{2}\hat{\theta}(t)^2$.

Here, $\hat{B} \geq \frac{1}{2}\hat{\theta}(t)^2$ and $\hat{B}$ may be calculated by the same squared queue arrival rate $\alpha(t)^2$ as all feasible path diversity cases in a single source scenario.

With respect to all feasible F selections, an additional routing path of minimizing $\hat{B}+Vp(t)+Q(t)\hat{\theta}(t)$ may be selected.

In an embodiment, the UAV system 100 consisting of 20 UAV nodes, including the source node 110 and the destination node 130, may be constructed.

The UAV nodes of the network may be included in a feasible routing path, and some nodes may participate in multiple data transmissions in multi-routing paths. The transmission power of each relay node 120 is assumed to be the same for simplicity and may be normalized to the total transmission power of the nodes in the network.

As the routing path selection increases, the sum of the transmission power by the path diversity method may be increased.

In this network topology, a throughput is measured in consideration of the success probability shown in Equation 7, and the power consumption may be measured by summing the transmission power of the nodes in the selected routing path.

The delay model follows gamma distribution and the data may be successfully transmitted within the time as shown in Equation 7. The throughput performance and the power consumption of the transmission method according to the present invention may be evaluated by various trade-off weights V to adjust a relationship between delay robustness and increased power consumption of path diversity.

The Lyapunov function and the Lyapunov drift may be calculated based on a normalized queue length between 0 and 1, and the upper bound of the Lyapunov drift may be used in the multi-path selection as shown in Table 1.

V is an adjustable parameter according to a use scenario and may check what a trade-off parameter is affected on multi-path selection for data transmission by comparing results according to three V values.

The performance of the method according to the present invention may be compared with a random transmission method that includes or does not include path diversity. As the simulation result, since a performance metric of the throughout and the power is varied, the normalized throughout and the power consumption may be checked.

Figure 3A:
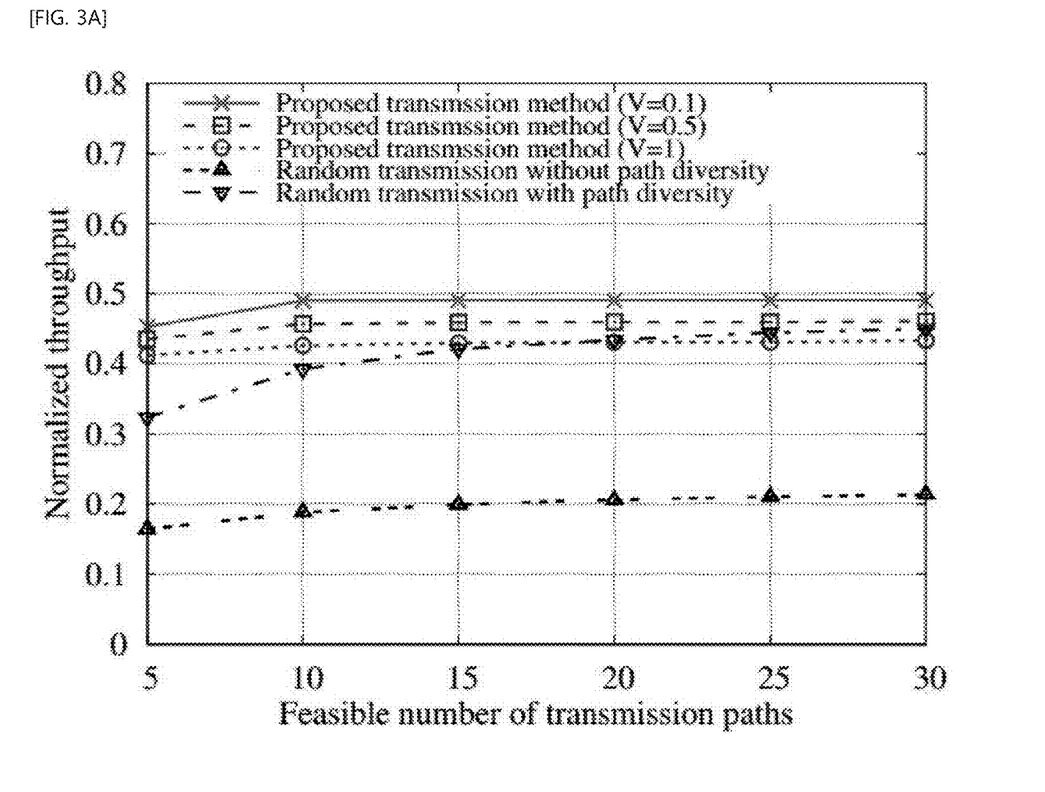
FIG. 3A is a diagram illustrating a normalized throughput performance graph in relation to the number of routing paths according to an embodiment of the present disclosure.

FIG. 3A is a diagram illustrating a normalized throughput performance graph in relation with the number of routing paths according to an embodiment of the present disclosure.

Referring to FIG. 3A, it is possible to confirm the normalized throughput performance in relation with the number of routing paths that can be transmitted in the UAV system 100. As a result, it can be confirmed that the throughput performance of the proposed transmission method according to the present invention varies depending on the trade-off weight V.

The throughput performance of the transmission method according to the present invention is increased as the trade-off weight V is decreased, but this is because a relative weight of the path diversity for satisfying a delay constraint is increased as a power consumption term of Equation 12.

The throughput performance of the transmission method according to the present invention varies depending on the trade-off weight V, but generally, it can be confirmed that the transmission method according to the present invention exhibits better throughput performance than a random transmission method having path diversity.

When the number of feasible transmission paths is decreased, the random transmission method may probabilistically select a small number of additional paths for delay tolerant data transmission.

As the additional paths are randomly selected by the random transmission method, the throughput performance may be improved.

However, since the transmission method according to the present invention adaptively selects the additional paths, it can be confirmed that the method according to the present invention having the trade-off weight V exhibits better throughput performance regardless of the number of feasible transmission paths in the UAV system 100.

The results of FIG. 3A may also exhibit the importance of path diversity in a network sensitive to the delay. The random selection method without path diversity technology may exhibit much worse throughout performance than other transmission methods.

Figure 3B:
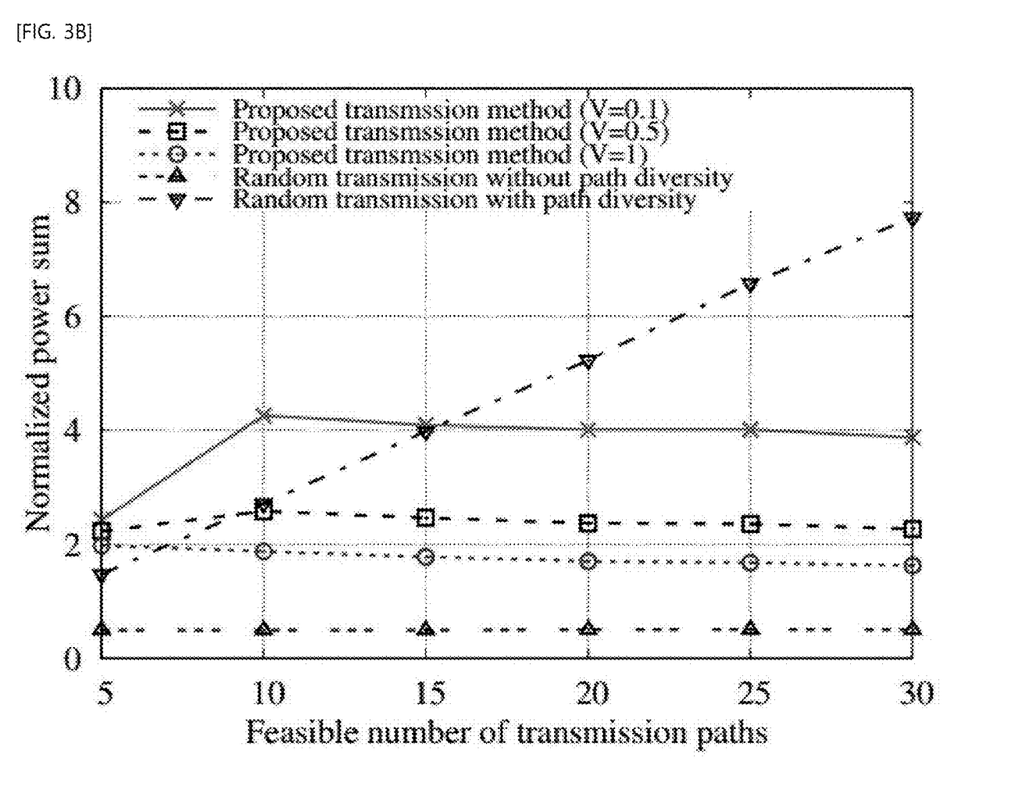
FIG. 3B is a diagram illustrating a normalized power consumption graph in relation with the number of transmission paths according to an embodiment of the present disclosure.

FIG. 3B is a diagram illustrating a normalized power consumption graph in relation with the number of transmission paths according to an embodiment of the present disclosure.

Referring to FIG. 3B, a power consumption graph related with the number of transmittable routing paths may be confirmed.

The increase of V may decrease the power consumption of the transmission method according to the present invention by selecting additional routing paths requiring less total transmission power in the UAV system 100.

As intended in the transmission method according to the present invention, a method having a large V value may be less power consumption than a method having a small V value regardless of the number of feasible transmission paths.

The random transmission using the power consumption and the path diversity of the transmission method according to the present invention may be compared. As a result, in the transmission method according to the present invention, it may be confirmed that when the number of feasible paths is small, more power is consumed than the random transmission using the path diversity.

However, as the number of feasible transmission paths is increased, the power consumption of the random transmission may be increased rapidly. On the contrary, in the transmission method according to the present invention, generally, it can be confirmed that the stable power consumption is shown without rapid increase of power consumption.

Figure 4:
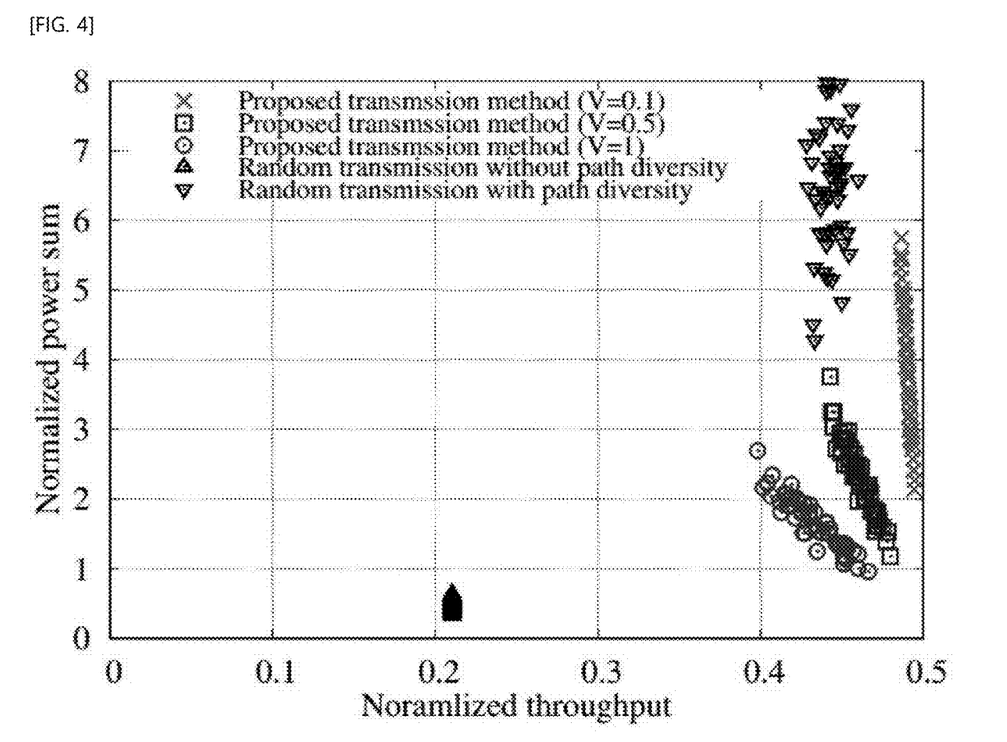
FIG. 4 is a diagram illustrating an energy efficiency performance graph according to an embodiment of the present disclosure.

FIG. 4 is a diagram illustrating an energy efficiency performance graph according to an embodiment of the present disclosure.

Referring to FIG. 4, power required in relation with achievable throughput performance may be exhibited.

As a result, it may be confirmed that in the transmission method according to the present invention, much less power consumption is required than the random transmission method having the path diversity, in order to achieve similar throughout performance.

For example, the proposed V=0.5 method and the random transmission method of the path diversity method may achieve similar throughout performance between 0.43 to 0.48.

However, required normalization power of the transmission method according to the present invention may be lower than 4, and the required normalization power of the random transmission method having path diversity may be higher than 4.

Meanwhile, the random transmission method without path diversity has less power consumption than other methods, but cannot achieve high throughout performance.

The performance evaluation may indicate that the transmission method according to the present invention increases the robustness of data transmission in the UAV system 100 sensitive to the delay without a rapid increase in power consumption for path diversity.

A Lyapunov-based energy-efficient path diversity method proposed through a well-adjusted trade-off weight V may provide excellent performance in both throughput and power consumption.

In an embodiment, a trade-off relationship between path diversity and power consumption in the UAV system 100 may be provided. In the transmission method according to the present invention, the delay robustness according to the path diversity is calculated and a robustness value may be used in Lyapunov drift-plus-penalty based transmission decision.

Through the simulation result, it can be confirmed that the transmission method according to the present invention provides high throughout performance with reasonable power consumption in the UAV system 100. A feasible routing path for efficient data transmission may be determined in a network where multiple source nodes are dynamically changed.

Figure 5:
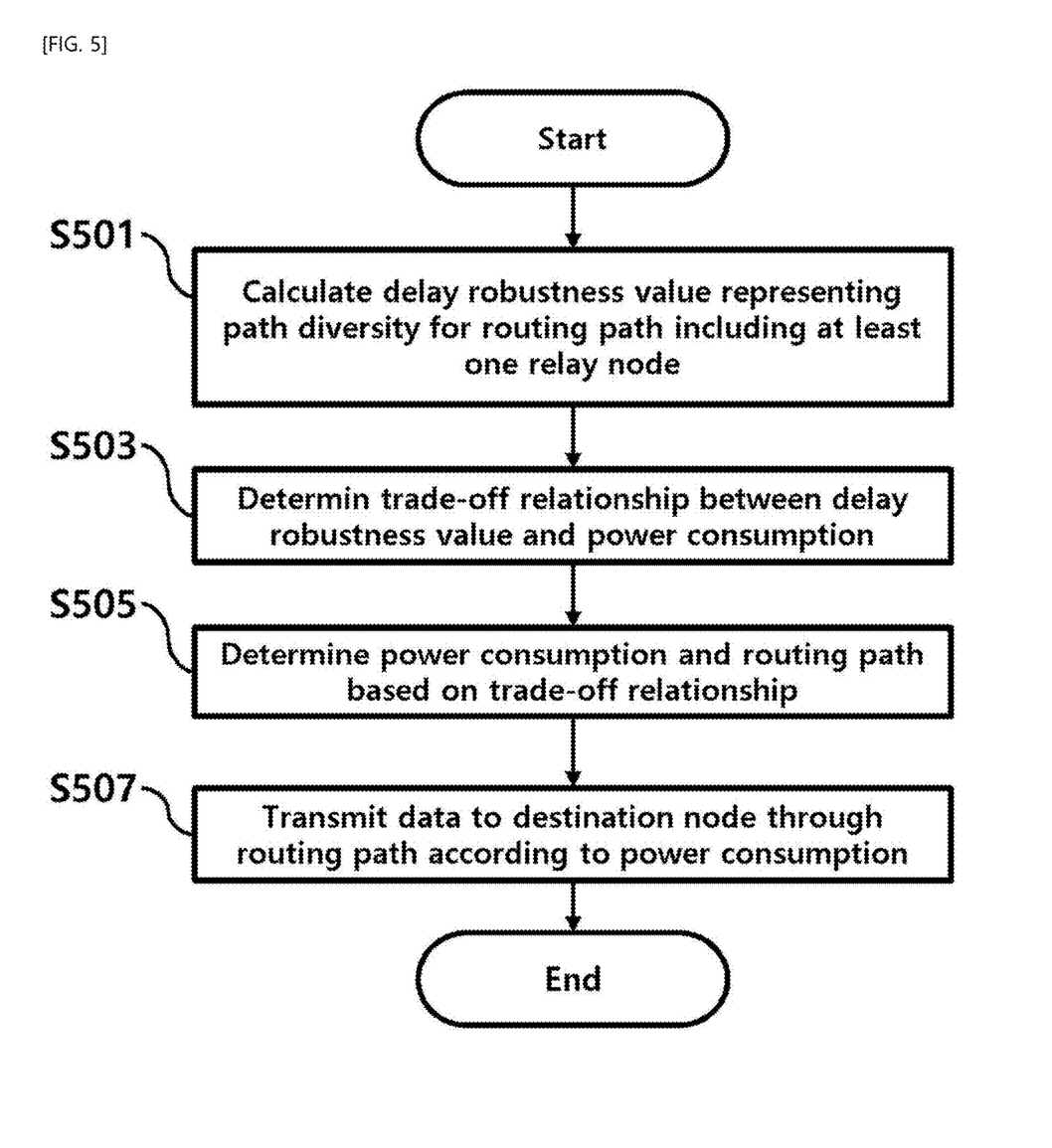
FIG. 5 is a diagram illustrating a data transmission method using path diversity according to an embodiment of the present disclosure.

FIG. 5 is a diagram illustrating a data transmission method using path diversity according to an embodiment of the present disclosure. In an embodiment, each step of FIG. 5 may be performed by the source node 110 of FIG. 1.

Referring to FIG. 5, step S501 is a step of calculating a delay robustness value representing path diversity for a routing path including at least one relay node 120.

Step S503 is a step of determining a trade-off relationship between the delay robustness value and power consumption.

In an embodiment, the trade-off relationship between the delay robustness value and the power consumption may be determined according to a Lyapunov function.

In an embodiment, a delay outage probability for the routing path may be determined based on the delay robustness value, a transmission success probability function may be determined based on the delay outage probability, queue state change information may be determined based on the transmission success probability function, and a trade-off relationship may be determined based on the queue state change information.

An upper bound of the outage probability of feasible routing path selection is calculated by introducing a robustness parameter representing transmission path diversity.

By using the calculated outage probability and queue arrival of the source node to the destination node, according to a Lyapunov drift-plus-penalty approach [7], a trade-off relationship between the delay robustness of the path diversity and the power consumption may be derived.

By using the strong Lyapunov optimization-based approach for data transmission, the proposed method efficiently increases the robustness of delay performance with efficient energy consumption in the UAV system 100.

Step S505 is a step of determining the power consumption and the routing path based on the trade-off relationship.

In an embodiment, the upper bound of the Lyapunov drift-plus-penalty of the Lyapunov function is minimized to determine the power consumption and the routing path.

Step S507 is a step of transmitting data to the destination node 130 through the routing path according to power consumption.

Figure 6:
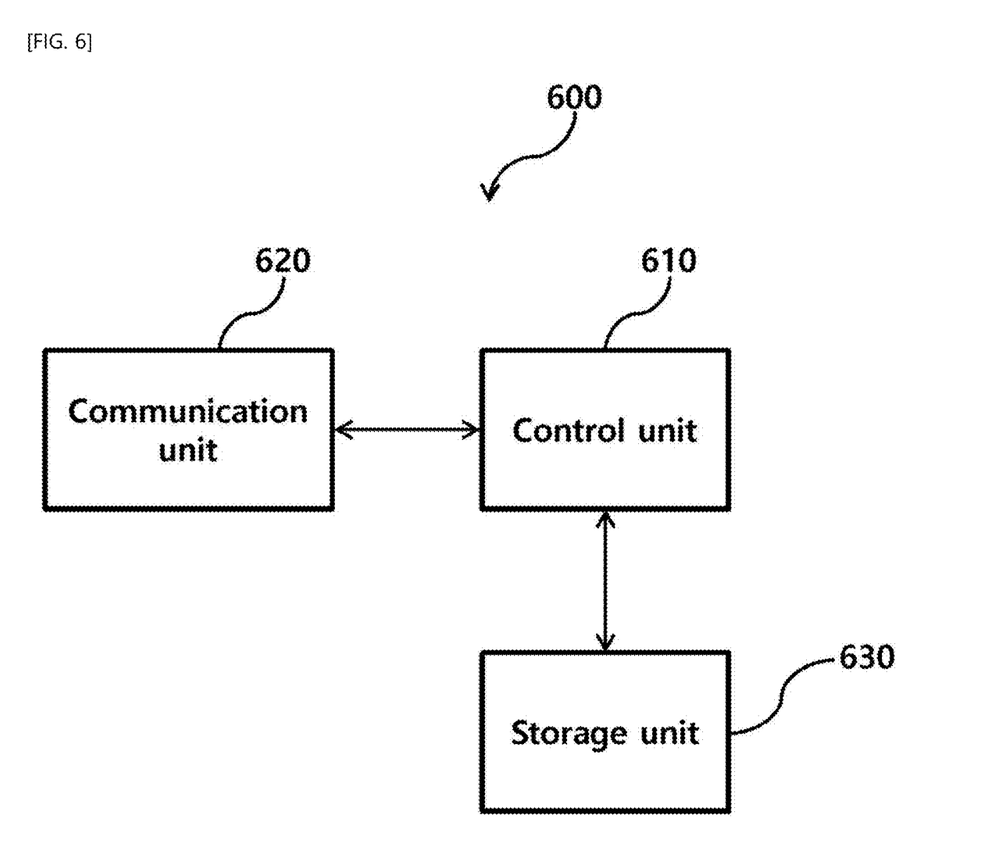
FIG. 6 is a diagram illustrating a functional configuration of a data transmission apparatus using path diversity according to an embodiment of the present disclosure.

FIG. 6 is a diagram illustrating a functional configuration of a data transmission apparatus 600 using path diversity according to an embodiment of the present disclosure.

Referring to FIG. 6, the data transmission apparatus 600 may include a control unit 610, a communication unit 620, and a storage unit 630. In an embodiment, the data transmission apparatus 600 may include the source node 110 of FIG. 1.

The control unit 610 may calculate a delay robustness value representing path diversity for the routing path including at least one relay node 120, determine a trade-off relationship between the delay robustness value and power consumption, and determine the power consumption and a routing path based on the trade-off relationship.

In an embodiment, the control unit 610 may include at least one processor or microprocessor, or a part of the processor. Further, the control unit 610 may be referred to as a communication processor (CP). The control unit 610 may control the operation of the data transmission apparatus 600 according to various embodiments of the present invention.

The communication unit 620 may transmit data to the destination node 130 through the routing path according to power consumption.

In an embodiment, the communication unit 620 may include at least one of a wired communication module and a wireless communication module. All or a part of the communication unit 620 may be referred to as a 'transmitter', 'receiver', or 'transceiver'.

In an embodiment, the storage unit 630 may be configured in a volatile memory, a non-volatile memory, or a combination of the volatile memory and the non-volatile memory. In addition, the storage unit 630 may provide data stored according to the request of the control unit 610.

Referring to FIG. 6, the data transmission apparatus 600 may include the control unit 610, the communication unit 620, and the storage unit 630. In various embodiments of the present invention, since the components described in FIG. 6 are not required, the data transmission apparatus 600 may be implemented with more components or less components than the components described in FIG. 6.

The above description is just illustrative of the technical idea of the present disclosure, and various changes and modifications can be made within the scope without departing from the essential characteristics of the present disclosure.

Various embodiments disclosed herein may be performed regardless of the order, and may be performed simultaneously or separately.

In an embodiment, at least one step may be omitted or added in each of the drawings described herein, and may be performed in reverse order, and may be performed simultaneously.

Therefore, the embodiments of the present disclosure are provided for illustrative purposes only but not intended to limit the technical concept of the present disclosure. The scope of the technical concept of the present disclosure is not limited thereto.

The protective scope of the present disclosure should be construed based on the following claims, and all the techniques in the equivalent scope thereof should be construed as falling within the scope of the present disclosure.

What is claimed is:

1. A data transmission method using path diversity comprising steps of:
   (a) calculating a delay robustness value representing path diversity for a routing path including at least one relay node;
   (b) determining a trade-off relationship between the delay robustness value and power consumption;
   (c) determining the power consumption and a routing path based on the trade-off relationship; and
   (d) transmitting data to a destination node through the routing path according to the power consumption.

2. The data transmission method using path diversity of claim 1, wherein step (b) includes determining a trade-off relationship between the delay robustness value and power consumption according to a Lyapunov function.

3. The data transmission method using path diversity of claim 2, wherein step (c) includes determining the power consumption and the routing path by minimizing the upper bound of a Lyapunov drift-plus-penalty of the Lyapunov function.

4. The data transmission method using path diversity of claim 1, wherein step (b) includes steps of:
   determining a delay outage probability for the routing path based on the delay robustness value;
   determining a transmission success probability function based on the delay outage probability;
   determining queue state change information based on the transmission success probability function; and
   determining a trade-off relationship based on the queue state change information.

5. A data transmission apparatus comprising:
   a control unit configured to calculate a delay robustness value representing path diversity for a routing path including at least one relay node, determine a trade-off relationship between the delay robustness value and power consumption, and determine the power consumption and a routing path based on the trade-off relationship; and
   a communication unit configured to transmit data to a destination node through the routing path according to the power consumption.

6. The data transmission apparatus of claim 5, wherein the control unit determines a trade-off relationship between the delay robustness value and power consumption according to a Lyapunov function.

7. The data transmission apparatus of claim 6, wherein the control unit determines the power consumption and the routing path by minimizing the upper bound of a Lyapunov drift-plus-penalty of the Lyapunov function.

8. The data transmission apparatus of claim 5, wherein the control unit
   determines a delay outage probability for the routing path based on the delay robustness value,
   determines a transmission success probability function based on the delay outage probability,
   determines queue state change information based on the transmission success probability function, and
   determines the trade-off relationship based on the queue state change information.

* * * * *